Sept. 16, 1958 G. XENAKIS 2,852,211
AIRPLANE WING WITH AERODYNAMICALLY ACTUATED SPOILER
Filed Sept. 21, 1956
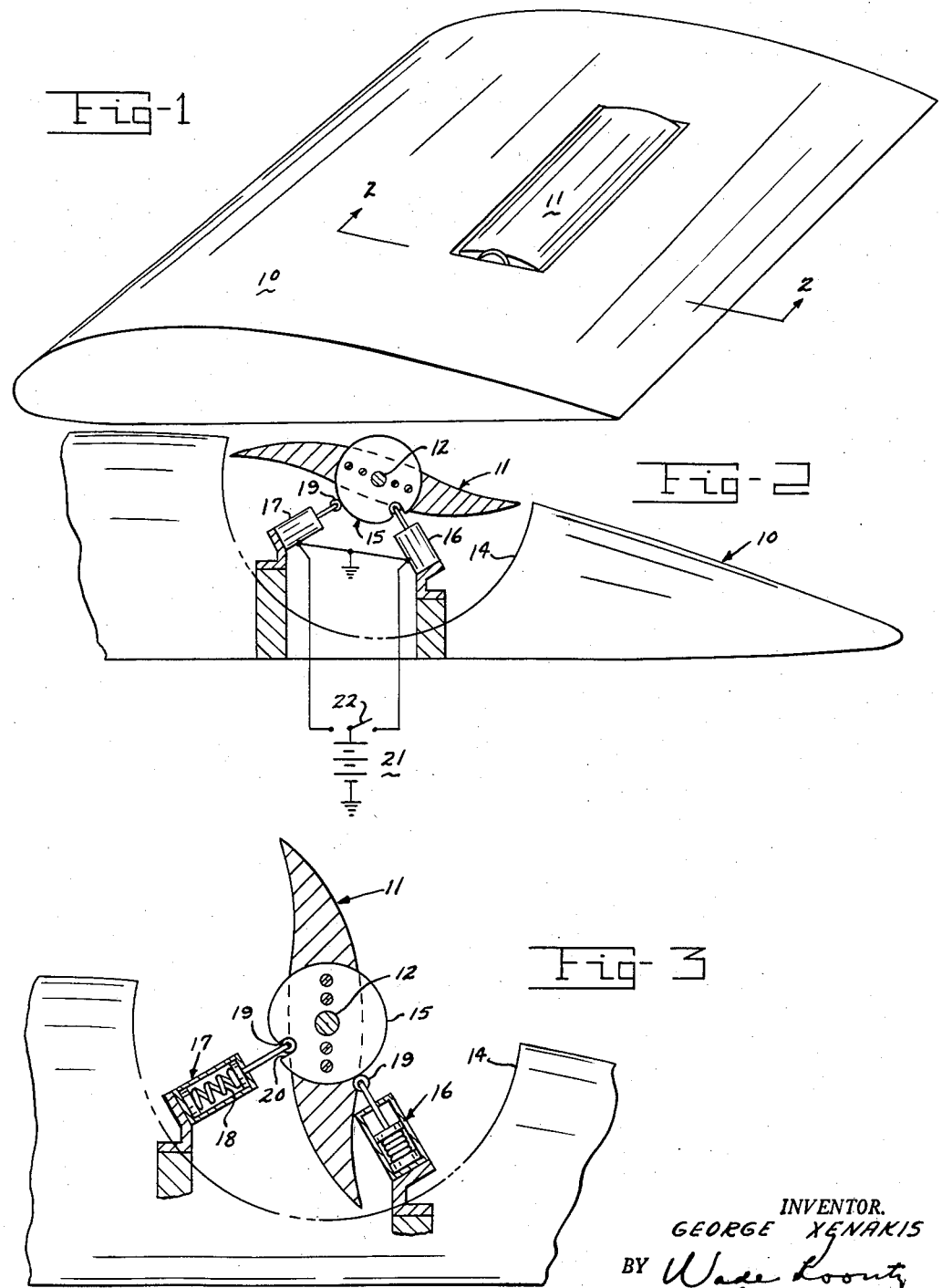
INVENTOR.
GEORGE XENAKIS
BY Wade Looney
Frank C. Leach Jr.
ATTORNEYS

United States Patent Office 2,852,211
Patented Sept. 16, 1958

2,852,211

AIRPLANE WING WITH AERODYNAMICALLY ACTUATED SPOILER

George Xenakis, Dayton, Ohio

Application September 21, 1956, Serial No. 611,398

4 Claims. (Cl. 244—42)

(Granted under Title 35, U. S. Code (1952), sec. 266)

The invention described herein may be manufactured and used by or for the United States Government for governmental purposes without payment to me of any royalty thereon.

This invention relates to a spoiler for an airplane, and more particularly, to a spoiler that is aerodynamically actuated.

Spoilers are employed on airplane wings to disrupt the airflow over the wing. When the spoiler is not in use, it is disposed within the wing. One method of lifting the spoiler from its position within the wing to its upright position where it affects the airflow over the wing is by a hinge type mechanism. However, the force acting against the spoiler increases as it is rotated about the hinge so that a relatively large force must be overcome by the hinge type mechanism when the spoiler nears its elevated vertical position.

This hinge type spoiler is satisfactory when the plane operates at low speeds. However, it is difficult to employ hinge type spoiler plates where the speeds are relatively high as in jet aircraft since the force necessary to overcome the airload increases in direct proportion to the square of the airspeed. Accordingly, the present invention provides a satisfactory means of using spoilers on high speed aircraft since the spoiler is actuated in response to the pressure differential existing adjacent the surface of the wing of the aircraft and the surface of the spoiler.

An object of the present invention is to provide an aerodynamically actuated spoiler.

Other objects of this invention will be readily perceived from the following description.

This invention relates to a spoiler for an aircraft wing in which the spoiler is pivotally mounted in the wing. The spoiler rotates in response to the pressure differential existing adjacent the surface of the wing and the surface of the spoiler. Rotation of the spoiler is prevented by locking means.

The attached drawing illustrates a preferred embodiment of the invention, in which Fig. 1 is a perspective view of an aircraft wing including the spoiler of the present invention;

Fig. 2 is a fragmentary sectional view taken along the line 2—2 of Fig. 1; and

Fig. 3 is an enlarged fragmentary sectional view of a portion of Fig. 2 with the spoiler in another position.

Referring to the drawing, there is shown an aircraft wing 10 having a spoiler 11 pivotally mounted on a shaft 12, which is disposed within the walls of a recess 14 in the upper surface of the wing 10. The spoiler 11 may be located anywhere on the surface of the aircraft wing 10 provided the contour of the spoiler 11 is so designed that its aerodynamic pressure distribution in conjunction with the pressure distribution of the aircraft wing gives a net pressure distribution on the spoiler that causes it to automatically rotate when not restrained. The movement of the spoiler 11 is restrained by a retaining member 15, which is secured thereto, cooperating with a locking or latching apparatus.

The locking apparatus includes at least two solenoids 16 and 17. Each of these solenoids has a spring 18 disposed within the housing thereof to urge a roller 19 outwardly therefrom. The roller 19 cooperates with a slot 20 in the retaining member 15, which controls the position of the spoiler 11. As will be seen from Figs. 2 and 3, the insertion of the roller 19 within the slot 20 determines the position of the spoiler 11. Thus, when the spring 18 has urged the roller 19 of the solenoid 16 into the slot 20, the spoiler 11 is maintained within the recess 14 (see Fig. 2) whereas when the roller 19 of the solenoid 17 is disposed within the slot 20 of the retaining member 15, the spoiler 11 is in an upright position (see Fig. 3).

The solenoids 16 and 17 are energized from a voltage source 21 through a double throw switch 22. Thus, when the switch 22 is moved to energize the solenoid 16, the force of the spring 18 is overcome and the roller 19 is retracted from the slot 20. The pressure distribution adjacent the surface of the wing 10 causes the spoiler 11 to rotate in a clockwise direction, as viewed in Figs. 2 and 3. Since the solenoid 17 is deenergized and the spring 18 is urging the roller 19 against the periphery of the retaining member 15, the roller 19 of the solenoid 17 enters the slot 20 when the spoiler 11 rotates to a position in which the spoiler is in an upright position (see Fig. 3). The switch 22 may be of the type permitting deenergization of the solenoid 16 after the roller 19 has been removed from this slot 20; it will be understood that the solenoid 16 could remain energized until the switch 22 was moved manually, if desired.

When the solenoid 17 is energized from the voltage source 21 by movement of the switch 22, the roller 19 is retracted from the slot 20 against the force of the spring 18 and the spoiler then rotates until the slot 20 is engaged by the roller 19 of the solenoid 16. It will be readily obvious that once the solenoid 16 is deenergized, the roller 19 again engages the periphery of the retaining member 15.

Considering the operation of the present invention, the spoiler 11 is restrained within the recess 14 by the solenoid 16 since its roller 19 is disposed within the slot 20 due to the force of the spring 18. When it is desired to spoil flow over the wing of the aircraft, the solenoid 16 is momentarily energized by the switch 22 to retract the roller 19 from the slot 20 whereby the spoiler 11 automatically rotates in a clockwise direction, as viewed in Figs. 2 and 3, due to the pressure differential existing at the surface of the wing 10 and the surface of the spoiler. The roller 19 of the solenoid 17 is held against the periphery of the retaining member 15 by its spring 18 and enters the slot or notch 20 to stop rotation of the spoiler 11. It will be readily understood that the solenoids 16 and 17 are disposed substantially 90° apart in order that the spoiler 11 is disposed within the recess in one position and is upright in its other position. While only the two solenoids 16 and 17 have been shown, it will be understood that other solenoids could be employed, if desired, to hold the spoiler 11 in angular positions other than the upright position.

When it is desired to return the spoiler 11 to its streamlined position within the recess 14 of the aircraft wing 10, the solenoid 17 is momentarily energized to allow the aerodynamic forces to rotate the spoiler to the position of Fig. 2 wherein the roller 19 of the solenoid 16 enters the slot 20.

While a specific type of latching apparatus has been shown, it will be understood that any suitable type of locking device could be employed as long as it held the spoiler in its extended position from the recess 14 so as to disturb the airflow over the wing 10 of the aircraft to produce a desired decrease in lift. By restraining the spoiler 11 within the recess 14, a minimum drag results therefrom. By the use of an appropriate profile for the spoiler 11, the automatic rotation of the spoiler may be obtained in transonic or supersonic flow as well as the subsonic flow to which the present description applies. The present invention has the particular advantage of reducing the hinge moment requirement.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. In an aircraft wing having a recess therein in the external surface thereof, a shaft disposed spanwise of the wing within the recess and mounted in the walls thereof, a spoiler rotatably mounted on the shaft, said spoiler in at least one of its rotary positions extending outwardly beyond said surface and having a contour designed to have an aerodynamic pressure distribution adjacent its surface cooperating with the pressure distribution adjacent the surface of the wing to produce a net pressure distribution on the spoiler so as to freely and continuously rotate the spoiler through 360° in the same direction, means to stop rotation of the spoiler and retain the spoiler within the recess, and means to stop rotation of the spoiler and retain the spoiler in a position in which a portion thereof extends exterior of the wing.

2. A spoiler for an aircraft wing, having a recess therefor extending spanwise of the wing, said spoiler being rotatably mounted in said recess on an axis extending spanwise of said wing to a plurality of predetermined rotative positions including a position extending spanwise and outwardly beyond the surface of the wing from within the recess in the wing, said spoiler having a contour shaped to have aerodynamic pressure distribution adjacent its surface cooperating with the pressure distribution adjacent the surface of the wing surrounding said recess to produce a net pressure distribution on said spoiler to freely and continuously rotate said spoiler through 360° in the same direction, and means to selectively stop free rotation of said spoiler in any of said predetermined positions.

3. In an aircraft wing having a spoiler receiving recess extending spanwise in the upper surface thereof, a spoiler extending spanwise of the upper surface of the wing and rotatably journalled in said recess, said spoiler having one rotative position extending outwardly from within said recess beyond the upper surface of the wing, said spoiler having a contour surface shaped to provide aerodynamic pressure distribution adjacent its surface cooperating with the pressure distribution adjacent the upper surface of the wing to produce a net pressure distribution on the spoiler to freely and continuously rotate the spoiler through 360° in the same direction, and means to stop rotation of said spoiler when it is in said one rotative position.

4. In an aircraft wing having a spoiler receiving recess therein extending spanwise of the wing, a spoiler, journal means to rotatably mount said spoiler within said recess on an axis extending spanwise of the wing, said spoiler having one rotative predetermined position wholly within said recess and another predetermined rotative position extending outwardly from the recess beyond the surface of the wing, and shaped to provide an aerodynamic pressure distribution adjacent its surface cooperating with the pressure distribution on the surface of the wing adjacent the opposite sides of said recess to produce a net pressure distribution on the spoiler to freely and continuously rotate the spoiler through 360° in the same direction, and means to selectively stop rotation of said spoiler in either of the aforesaid two positions.

References Cited in the file of this patent

UNITED STATES PATENTS

| | | |
|---|---|---|
| 1,951,464 | Wragg | Mar. 20, 1934 |
| 2,329,177 | Baker | Sept. 14, 1943 |
| 2,402,118 | Ashkenas | June 18, 1946 |
| 2,635,837 | Grant | Apr. 21, 1953 |
| 2,730,313 | Ringham | Jan. 10, 1956 |